US007543510B2

(12) United States Patent
Bieck et al.

(10) Patent No.: US 7,543,510 B2
(45) Date of Patent: Jun. 9, 2009

(54) FOIL-TYPE SWITCHING ELEMENT WITH MULTI-LAYERED CARRIER FOIL

(75) Inventors: Werner Bieck, Wiltingen (DE); Driss Chabach, Noertrange (LU); Yves Decoster, Ethe (BE); Aloyse Kirsch, Contern (LU)

(73) Assignee: IKE International Electronics & Engineering S.A., Luxembourg (LU)

( * ) Notice: Subject to any disclaimer, the term of this patent is extended or adjusted under 35 U.S.C. 154(b) by 0 days.

(21) Appl. No.: 10/538,600

(22) PCT Filed: Dec. 8, 2003

(86) PCT No.: PCT/EP03/50963

§ 371 (c)(1),
(2), (4) Date: Oct. 27, 2006

(87) PCT Pub. No.: WO2004/053908

PCT Pub. Date: Jun. 24, 2004

(65) Prior Publication Data

US 2007/0144882 A1 Jun. 28, 2007

(30) Foreign Application Priority Data

Dec. 9, 2002 (EP) .................................. 02102706

(51) Int. Cl.
*G01L 1/26* (2006.01)

(52) U.S. Cl. ........................................................ 73/862

(58) Field of Classification Search ................................ 73/862.381–862.382, 862.391, 862.386, 73/760–862
See application file for complete search history.

(56) References Cited

U.S. PATENT DOCUMENTS 3,898,981 A * 8/1975 Basham ...................... 600/535
4,268,815 A 5/1981 Eventoff et al.
4,314,227 A 2/1982 Eventoff
4,348,557 A 9/1982 Sado (Continued)

FOREIGN PATENT DOCUMENTS

DE 35 13 360 10/1986

(Continued)

OTHER PUBLICATIONS

International Search Report; PCT/EP03/50963; Mar. 18, 2004.

(Continued)

*Primary Examiner*—Max Noori
(74) *Attorney, Agent, or Firm*—Cantor Colburn LLP

(57) ABSTRACT

A foil-type pressure sensor includes a first carrier foil and a second carrier foil arranged at a certain distance from each other by means of a spacer, the spacer comprising at least one recess defining an active area of the pressure sensor. At least two electrodes are arranged in the active area of the pressure sensor between said first and second carrier foils in such a way that, in response to a pressure acting on the active area of the pressure sensor, the first and second carrier foils are pressed together against the reaction force of the elastic carrier foils and an electrical contact is established between the at least two electrodes. According to the invention, at least one of the carrier foils includes a multi-layered configuration with at least two layers of different materials.

15 Claims, 3 Drawing Sheets

U.S. PATENT DOCUMENTS

Figure 1:
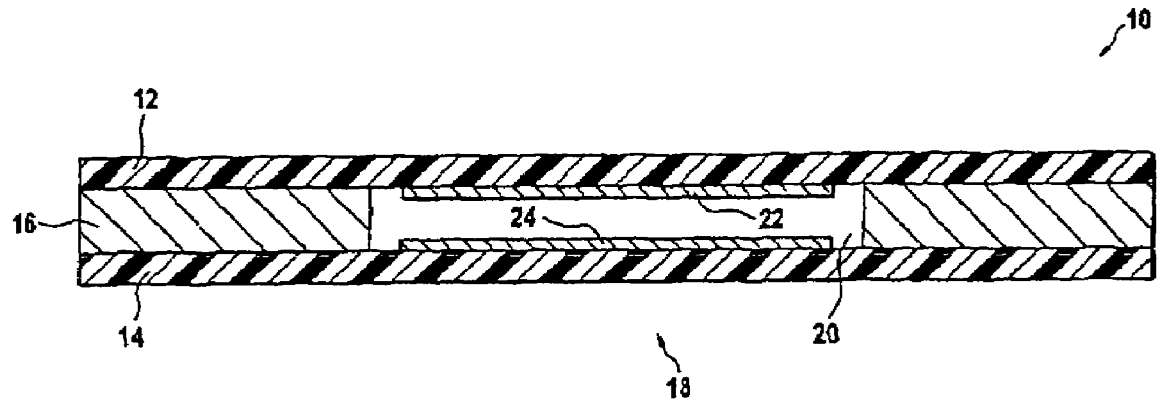

| | | | | | |
|---|---|---|---|---|---|
| 4,362,911 | A | | 12/1982 | Sears et al. | |
| 4,517,421 | A | | 5/1985 | Margolin | |
| 4,520,248 | A | | 5/1985 | Woelfel | |
| 4,679,030 | A | | 7/1987 | Volnak | |
| 4,786,767 | A | | 11/1988 | Kuhlman | |
| 4,911,053 | A | * | 3/1990 | Kashio et al. | 84/725 |
| 5,050,034 | A | * | 9/1991 | Hegner et al. | 361/283.4 |
| 5,060,527 | A | * | 10/1991 | Burgess | 73/862.68 |
| 5,526,703 | A | * | 6/1996 | Aslam et al. | 73/862.68 |
| 5,533,395 | A | * | 7/1996 | Wan | 73/504.01 |
| 5,693,886 | A | * | 12/1997 | Seimiya et al. | 73/718 |
| 5,871,842 | A | | 2/1999 | Crotzer et al. | |
| 6,072,130 | A | * | 6/2000 | Burgess | 200/86 R |
| 6,109,113 | A | * | 8/2000 | Chavan et al. | 73/718 |
| 6,271,482 | B1 | | 8/2001 | Crotzer et al. | |
| 6,531,951 | B2 | * | 3/2003 | Serban et al. | 338/47 |

FOREIGN PATENT DOCUMENTS

| | | |
|---|---|---|
| DE | 36 28 781 | 3/1987 |
| DE | 199 23 806 | 2/2001 |
| EP | 0 936 852 | 8/1999 |
| EP | 1 197 835 | 4/2002 |
| FR | 2 532 467 | 3/1984 |
| GB | 2 133 216 | 7/1984 |
| JP | 01 176615 | 10/1989 |
| WO | WO 81/00787 | 3/1981 |
| WO | WO 01/95357 | 12/2001 |

OTHER PUBLICATIONS

Database WPI; Section EI; Week 198907; Derwent Publications, Ltd.; London, GB; AN 1989-052887; XP002239792 & SU 1 415 258 A (Moroz IV); Jul. 8, 1988.

* cited by examiner

FOIL-TYPE SWITCHING ELEMENT WITH MULTI-LAYERED CARRIER FOIL

CROSS REFERENCE TO RELATED APPLICATION

This application is related to the commonly assigned applications entitled "Foil-Type Switching Element", filed concurrently herewith, in the name of Werner Bieck, et al., which is the U.S. National Stage of application PCT/EP2003/050961 having an International Filing Date of 8 Dec. 2003, and "Foil-Type Switching Element with Dielectric Layer",filed concurrently herewith, in the name of Werner Bieck, et al., which is the U.S. National Stage of application PCT/EP2003/050962 having an International Filing Date of 8 Dec. 2003, which said applications are incorporated herein by reference in their entirety.

TECHNICAL FIELD OF INVENTION.

The present invention relates to a foil-type switching element comprising a first carrier foil and a second carrier foil arranged at a certain distance from each other by means of a spacer. The spacer comprises at least one recess, which defines an active area of the switching element. At least two electrodes are arranged in the active area of the switching element between said first and second carrier foils in such a way that, in response to a pressure acting on the active area of the switching element, the first and second carrier foils are pressed together against the reaction force of the elastic carrier foils and an electrical contact is established between the at least two electrodes.

BRIEF DESCRIPTION OF RELATED ART

Several embodiments of such foil-type switching elements are well known in the art. Some of these switching elements are configured as simple switches comprising e.g. a first electrode arranged on the first carrier foil and a second electrode arranged on the second carrier foil in a facing relationship with the first planar electrode. The electrodes may be of a planar configuration covering essentially the entire surface of the respective carrier foil inside of the active area.

Other switching elements known in the art are configured as pressure sensors having an electrical resistance, which varies with the amount of pressure applied. In a first embodiment of such pressure sensors, a first electrode is arranged on the first carrier foil and a second electrode is arranged on the second carrier foil in facing relationship with the first electrode. At least one of the electrodes is covered by a layer of pressure sensitive material, e.g. a semi-conducting material, such that when the first and second carrier foils are pressed together in response of a force acting on the switching element, an electrical contact is established between the first and second electrode via the layer of pressure sensitive material. The pressure sensors of this type are frequently called to operate in a so called "through mode".

In an alternative embodiment of the pressure sensors, a first and a second electrode are arranged in spaced relationship on one of the first and second carrier foils while the other carrier foil is covered with a layer of pressure sensitive material. The layer of pressure sensitive material is arranged in facing relationship to the first and second electrode such that, when said first and second carrier foils are pressed together in response to a force acting on the active area of the switching element, the layer of pressure sensitive material shunts the first and second electrode. These sensors are called to operate in the so-called "shunt mode".

The above-described switching elements can be manufactured cost-effectively and have proven to be extremely robust and reliable in practice.

The electrical response of such a switching element depends on the type of the electrodes, the presence of a possible layer of pressure sensitive material, the design of the electrodes and their arrangement within the active area of the switching element and finally on the physical contact, which is established between the electrodes in response to a force acting on the active area. The physical contact between the electrodes is determined by the mechanical response of the switching element in case of a force acting on the active area. This mechanical response depends on the elastic properties of the carrier foils, usually a PET foil, the lateral dimension of the active area and the distance between the two opposed carrier foils.

For a given size and configuration of the switching element, the mechanical response of the switching element can accordingly be adapted by adjusting the mechanical properties of the carrier foils. This can be done by suitably choosing the material of the carrier foil and by adapting the thickness of the carrier foil to the desired mechanical response. The choice of the carrier foil material is governed by several requirements. The material to be used should first of all have a high and constant elasticity modulus and provide a good mechanical robustness and a high chemical resistance to the switching element. Furthermore a high resistance against humidity is preferable. Besides these requirements, the material should provide a good adhesion to the conductive ink of the electrodes and resist to the ink stresses during the curing of the ink in order to minimise deformation of the carrier foil. The material should also allow an adequate coating with semi-conducting materials and should not be susceptible to electrical discharging. Finally the costs for the material to be used should be low.

Unfortunately no substrate material in the market fulfils all these requirements so that the choice of the material finally constitutes a compromise between the desired properties and costs for the material.

GENERAL DESCRIPTION OF THE INVENTION

The present invention provides a foil-type switching element according to claim 1. This foil-type switching element comprises a first carrier foil and a second carrier foil arranged at a certain distance from each other by means of a spacer, said spacer comprising at least one recess defining an active area of the switching element. At least two electrodes are arranged in the active area of the switching element between said first and second carrier foils in such a way that, in response to a pressure acting on the active area of the switching element, the first and second carrier foils are pressed together against the reaction force of the elastic carrier foils and an electrical contact is established between the at least two electrodes. According to the invention, at least one of said carrier foils comprises a multi-layered configuration with at least two layers of different materials.

The properties of the switching element of the present invention can be adjusted freely to the requirements of the application of the switching element. In fact, the multi-layered configuration of the carrier foil enables to combine the different mechanical, chemical and electrical properties of the different materials in order to provide a carrier foil having the required combined properties. The need for compromise between several properties is thus no longer given and the switching element can be precisely adapted to its actual application. It will be appreciated that even the cost factor may be satisfactorily controlled, as even high price materials are only used in very thin layers, the thickness of which are only a fraction of the thickness of the entire carrier foil.

Each of the different layers of the multi-layered carrier foil has specific dominant properties, which will be conferred to the combined carrier foil. It follows that if a specific property of the carrier foil is to be increased in order to provide a desired mechanical response of the switching element, a material layer providing this property will be added to the carrier foil or the thickness of an already present layer can be increased.

For an application, where a switching element is mounted with its lower face on a rigid support and a force acts only on the upper face of the switching element, it may be interesting to provide only the upper one of the first and second carrier foils with a multi-layered configuration. Such an embodiment of the switching element is very inexpensive. However if the sensor or switching element is to be mounted on a soft support, the reaction of the support will contribute to the mechanical response of the sensor. It follows that in a preferred embodiment of the invention each of said first and said second carrier foils comprises a multi-layered configuration with at least two layers of different materials.

It will be appreciated, that depending on the application of the switching element, an asymmetric behaviour of the switching element may be desirable. In such a case, the properties of the first and second carrier foils are preferably different from one another. Such an asymmetric behaviour can e.g. be provided by a foil-type switching element wherein the number of layers in the multi-layered configurations of said first and second carrier foils are different and/or wherein the layers of the multi-layered configuration of said first carrier foil are made of materials which are different from the materials of the layers of the multi-layered configuration of said second carrier foil. These embodiments allow for instance to provide a sensor or switching element, the upper side of which has a specific electrical property whereas the lower side of the sensor is specifically adapted in order to be mounted in a chemically aggressive environment.

In a preferred embodiment of the invention, the layers of said multi-layered carrier foil comprise materials having different mechanical properties. The different layers of e.g. made of plastic foils having different moduluses of elasticity or materials, which have a dominant modulus of elasticity in different temperature ranges. The so formed carrier foil will then e.g. exhibit a higher modulus of elasticity or a more constant modulus over a wide temperature range. In this way, the mechanical response of the switching element over the temperature may be adjusted to the need of the sensor or switching element application.

The different layers of the multi-layered carrier foil may comprise different plastic foils. Alternatively one or more of said layers comprises a cured dielectric resin layer and/or a metal foil. The use of a metal foil as one of the layers of the carrier foil enables to shield the switching element against electromagnetic radiation in the environment of the switching element. Furthermore, the presence of a metal foil enables the switching element to be used simultaneously in a capacitive sensing system.

In an advantageous embodiment using metal layers, the multilayered carrier foil comprises two layers of different metals. The two different metals allow using the bimetal effect in order to deform the carrier foil in the region of the active area into a dome shape. Such a dome shaped carrier foil allows to adjust the sensor sensitivity and to increase the homogeneity of the sensor response over a specific temperature range. It should be noted that a kind of "bimetal" effect may also be obtained with two plastic films having respective coefficients of thermal expansion which are strongly different.

If the switching element is designed to be used in a chemically aggressive environment, one of said layers of said multi-layered carrier foil, e.g. the outer layer, preferably comprises a material with a high chemical resistance. In another embodiment, where the switching element is used in a environment with high fire risk, one of said layers of said multi-layered carrier foil advantageously comprises a flame-retarding material.

It will be noted by the skilled person, that the different layers of said multi-layered carrier foil can have a different thickness. The thickness of the different layers may e.g. be adapted in order to adjust the "amount" of their dominant property in the multi-layered carrier foil.

The multi-layered carrier foil may be produced by several different processes. In a first embodiment, the layers of said multi-layered carrier foil are e.g. laminated together by means of an adhesive. Alternatively the layers of said multi-layered carrier foil are extruded one onto the other. A further possibility, especially with metallic layers or cured resin layers, is to deposit the layers on a base layer. In a multi-layered configuration with several layers, a combination of these assembly techniques is also possible, i.e. several of the layers being laminated while others are deposited or extruded onto the laminate.

The skilled person will appreciate, that the present invention is applicable to simple membrane switches as well as to pressure sensitive switches. In case of a simple membrane switch a first electrode is arranged on an inner surface of said first carrier foil and a second electrode is arranged on an inner surface of the second carrier foil in a facing relationship with said first electrode. In a variant of a simple switch, a first and a second electrode are arranged side by side on an inner surface of said first carrier foil and a shunt element is arranged on an inner surface of the second carrier foil in facing relationship with said first and second electrodes. The two electrodes may e.g. comprise a comb shaped configuration, with the teeth of the two electrodes being arranged in an interdigitating relationship. Foil-type pressure sensors are similarly configured as the above described switches. In contrast to the switches, at least one of said first and second electrode is covered by a pressure-sensitive resistive material. In an alternative embodiment, the said shunt element comprises a resistive material. Due to the pressure-sensitive resistive or semiconducting material, the electrical resistance between the electrodes of these pressure sensors depends on the pressure with which the two carrier foils are pressed together.

DETAILED DESCRIPTION WITH RESPECT TO THE FIGURES

Figure 2:
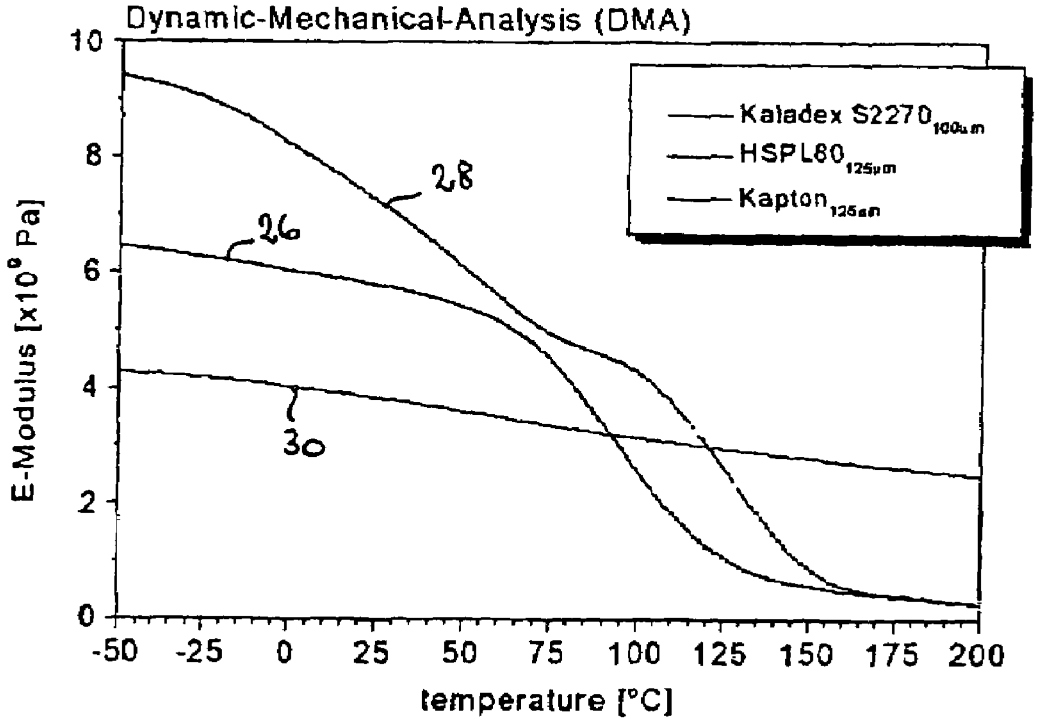
Figure 3:
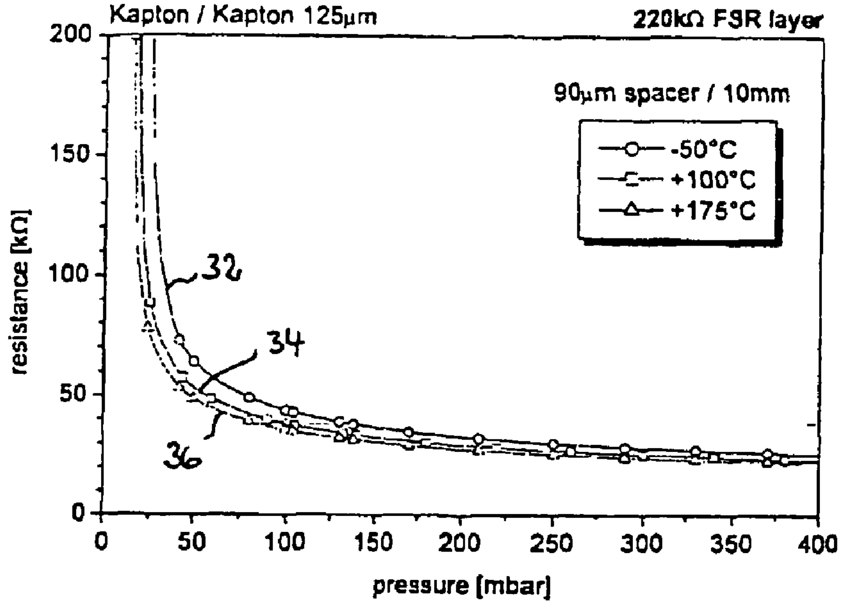
Figure 4:
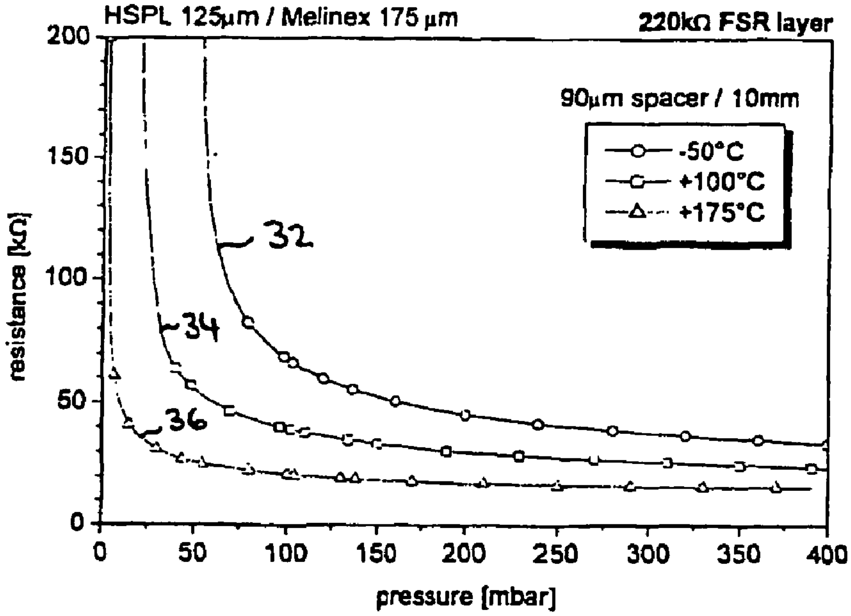
Figure 5:
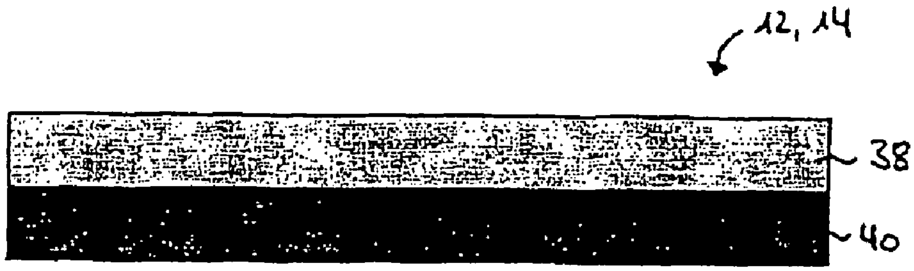
Figure 6:
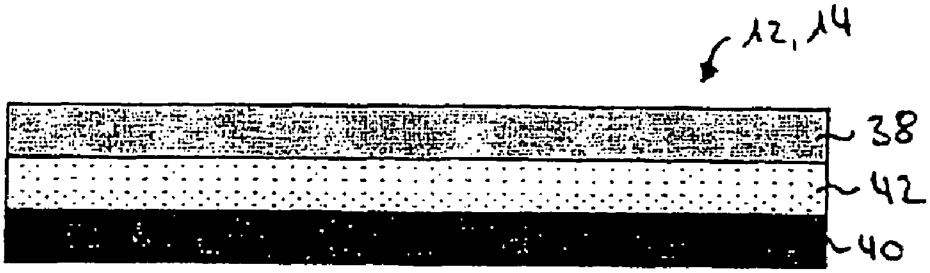
Figure 7:
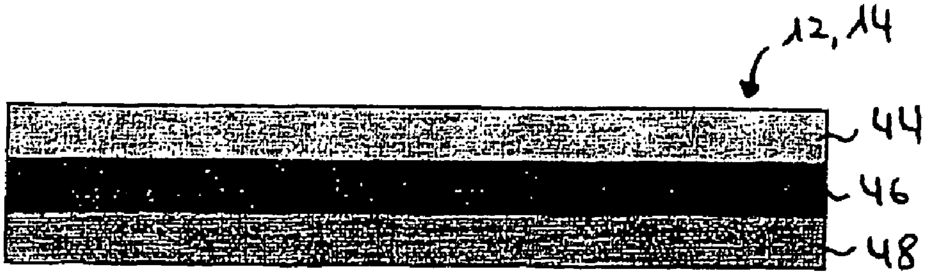
Figure 8:
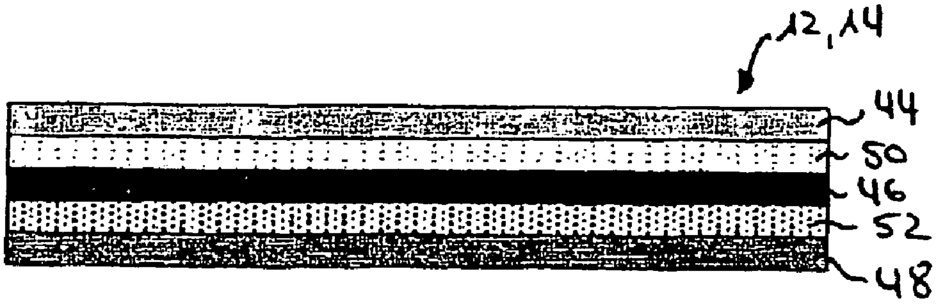

The present invention will be more apparent from the following description of several not limiting embodiments with reference to the attached drawings, wherein FIG. 1: generally shows a section of a foil-type switching element;

FIG. 2: shows the dependence on temperature of the modulus of elasticity for different carrier foil materials;

FIG. 3: shows the electrical response function of a typical pressure sensor with PI carrier foils for different temperatures;

FIG. 4: shows the electrical response function of a typical pressure sensor with PET carrier foils for different temperatures;

FIG. 5: shows a first embodiment of a carrier foil of a switching element according to the present invention;

FIG. 6: shows a second embodiment of a carrier foil of a switching element according to the present invention;

FIG. 7: shows a third embodiment of a carrier foil of a switching element according to the present invention;

FIG. 8: shows a fourth embodiment of a carrier foil of a switching element according to the present invention.

A section of a typical foil-type switching element 10 is represented in FIG. 1. The switching element 10 comprises a first carrier foil 12 and a second carrier foil 14, which are arranged at a certain distance by means of a spacer 16. The spacer 16 may e.g. comprise a double-sided bonding sheet. In an active area, generally referenced as 18, of the switching element 10, the spacer 16 comprises a recess or cut-out 20 such that, in the active area 18, the two carrier foils 12 and 14 face each other at a certain distance.

Contact arrangements 22 and 24 are arranged in the active area 18 on the inner surfaces of the carrier foils 12 and 14 in such a way that an electrical contact is established between the contact arrangements 22 and 24 if said carrier foils are pressed together. In the shown embodiment, one contact arrangement 22 or 24 is arranged on each of said carrier foils 12 and 14 in a facing relationship. It should however be noted that other layouts, e.g. with two spaced contact arrangements 22 and 24 arranged on one of the carrier foils and a shunt element arranged on the second carrier foil, are also possible. The contact arrangements may comprise electrodes, wherein at least one of the contact arrangements comprises a layer of pressure sensitive material. Such a layer of pressure sensitive material confers a pressure depending behaviour to the switching element such that the switching element can be used as pressure sensor. It should be noted that the contact arrangements are usually printed onto the respective carrier foils using a screen-printing process prior to the laminating process, in which the carrier foils and the spacer are laminated together.

The carrier foil of prior art foil-type switching elements consists usually of a plastic sheet material such as PET, PI or PEN, which if necessary has under-gone a surface treatment in order to enhance the adhesion on the printed electrodes.

The elastic properties of such single sheet materials do not always correspond to the requirements with respect to the mechanical response of the switching element. For instance, the dependency of the elastic modulus of PET or PEN shows a significant step at respective threshold temperature, which confers a non-optimum behaviour to the switching element. FIG. 2 displays the modulus of elasticity versus temperature for different substrate materials obtained by DMA analyses in the range of −50° C. up to +200° C. For low temperatures the elasticity of PET (HSPL) (graph referenced by 26) is about 6 GPa and exhibits a significant step around T=90° C. down to a value <1 GPa above +175° C. Contrary to that, the temperature dependent elasticity modulus E(T) of PEN (Kaladex) (referenced as 28) decreases monotonously showing a final step around T=140° C. and the modulus of elasticity of PI (Kapton) (reference sign 30) indicates only little variations over the complete temperature range (<50%/250° C.).

The resulting temperature dependences of the electrical response function for a typical pressure sensor formed by PI/PI or PET/PET carrier foil systems are presented, in FIG. 3 resp. FIG. 4. These graphs show the electrical resistance R of typical pressure sensors comprising two carrier foils with a thickness of 125 μm separated by a 90 μm spacer for different pressures acting on the respective active areas. The respective graphs are shown for different temperatures of −50° C. (32), +100° C. (34) and +175° C. (36).

Because of the thermal stability of the elasticity of PI the corresponding array of response curves R(p,T) covers a well localised R-p-region. The turn-on-point ranges between 20 mbar (for +175° C.) and 40 mbar (for −50° C.). The plot of PET/PET system demonstrates the strong increase of the sensitivity of the cell as soon as the temperature exceeds 75° C. The turn-on-point of about 70 mbar at RT merges a theoretical value of 5 mbar above 150° C.

To guarantee the same sensor response over the automotive temperature range (−40° C. to 105° C.), the use of a substrate with a constant elasticity modulus over this temperature range is a needed. Furthermore the film should posses the following properties to fulfil e.g. the automobile and sensor manufacturing requirements:

- very good mechanical robustness,
- high chemical resistance,
- high resistance against humidity
- quick relaxation after a submission to high stress at high temperature (creep),
- high and constant elasticity modulus
- good ink adhesion or allow an adequate coating,
- resist the ink stress during the ink curing (no deformation)
- no electrical discharging (static electricity)
- low price In order to overcome this problem, the present invention proposes the use of multi-layered carrier foils comprising at least two layers of different materials. Such a multi-layered carrier foil 12, 14 is schematically represented in FIG. 5. The shown embodiment comprises two layers 38 and 40 of different materials, e.g. one PET sheet and one PI sheet or one PET sheet and one cured resin layer or metal layer, which are solidly fixed together. The two layers 38 and 40 may be fixed by any suitable process. The resulting multi-layered carrier foil 12, 14 exhibits mechanical, chemical or electrical properties which are a combination of the individual properties of the two layers 38 and 40.

It should be noted that the overall thickness of the combined carrier foil does not need to be increased with respect to prior art carrier foils. In fact the individual layers 38 and 40 will usually have a thickness, which is only a fraction of the thickness of a classical carrier foil.

A second embodiment of a carrier foil 12,14 is shown in FIG. 6. in this embodiment, two layers 38 and 40 of suitable material are laminated together by means of an adhesive layer 42. The adhesive layer 42 in the shown embodiment has a thickness comparable to the one of the two layers 38 and 40. It will however be noted, that the thickness of the adhesive layer 42 may as well be much smaller than the thickness of the layers 38 and 40. Alternatively the adhesive layer may be thicker than each of the layers 38 and 40. Furthermore, while the two layers 38 and 40 are shown to have the same thickness, it will be understood, that the different layers may have a different thickness each.

An embodiment having three layers 44, 46 and 48 is shown in FIG. 7. Each of the three layers 44, 46 and 48 can comprise one of plastic foil, metal or a dielectric resin. The three layers are assembled together without the use of an adhesive. Coextrusion or deposition techniques could be used. The different layers could have the same thickness or a different thickness each. Furthermore the layers 44 and 48 may be made of the same material or of different materials. It will be noted that the use of a metal layer enables the sensor to be used also as a capacitive sensor. It will further be appreciated that the use of two layers of different metals allow using the bimetal effect in order to deform the carrier foil in the region of the active area into a dome shape. Such a dome shaped carrier foil allows to adjust the sensor sensitivity and to increase the homogeneity of the sensor response over a specific temperature range. A similar "bimetal" effect may also be obtained with two plastic films, provided that the coefficient of thermal expansion of the two film materials is strongly different.

An embodiment of the carrier foil with three layers 44, 46 and 48, which are assembled together by lamination is represented in FIG. 8. The different layers are laminated together by use of adhesive layers 50 and 52. The adhesive layers may comprise the same adhesive of different adhesives, which are adapted to the different materials to be laminated. Furthermore the layers 44 and 48 may be made of the same material or of different materials. As stated above, each of the different layers may have a thickness, which is different from that of the other layers. The thickness of the different layers may e.g. be adapted in order to adjust the influence of their dominant property in the combined multi-layered carrier foil properties.

The invention claimed is:

1. Foil-type pressure sensor comprising:

a first carrier foil and a second carrier foil arranged at a certain distance from each other by means of a spacer, said spacer comprising at least one recess defining an active area of the pressure sensor, and at least two electrodes and a layer of pressure sensitive material arranged in the active area of the pressure sensor between said first and second carrier foils in such a way that, in response to a pressure acting on the active area of the pressure sensor, the first and second carrier foils are pressed together against a reaction force of elastic carrier foils and an electrical contact is established between the at least two electrodes via said layer of pressure sensitive material, wherein at least one of said first and second carrier foils comprises a multi-layered configuration with at least two layers of different materials having different elastic properties so that the elastic properties of said at least one carrier foil are a combination of the individual elastic properties of said at least two layers.

2. Foil-type pressure sensor according to claim 1, wherein each of said first and said second carrier foils comprises a multi-layered configuration with at least two layers of different materials.

3. Foil-type pressure sensor according to claim 2, wherein the number of layers in the multi-layered configurations of said first and second carrier foils are different.

4. Foil-type pressure sensor according to claim 2, wherein the layers of the multi-layered configuration of said first carrier foil are made of materials which are different from the materials of the layers of the multi-layered configuration of said second carrier foil.

5. Foil-type pressure sensor according to claim 1, wherein said layers of said multi-layered carrier foil comprise materials having different mechanical properties.

6. Foil-type pressure sensor according to claim 5, wherein said layers of said multi-layered carrier foil comprise materials having a different modulus of elasticity.

7. Foil-type pressure sensor according to claim 1, wherein one of said layers of said multi-layered carrier foil comprises a dielectric resin layer.

8. Foil-type pressure sensor according to claim 1, wherein one of said layers of said multi-layered carrier foil comprises a metal foil.

9. Foil-type pressure sensor according to claim 1, wherein the multi-layered carrier foil comprises two layers of different metals.

10. Foil-type pressure sensor according to claim 1, wherein one of said layers of said multi-layered carrier foil comprises a material with a high chemical resistance.

11. Foil-type pressure sensor according to claim 1, wherein one of said layers of said multi-layered carrier foil comprises a flame-retarding material.

12. Foil-type pressure sensor according to claim 1, wherein the different layers of said multi-layered carrier foil have a different thickness.

13. Foil-type pressure sensor according to claim 1, wherein layers of said multi-layered carrier foil are extruded one onto the other.

14. Foil-type pressure sensor according to claim 1, wherein layers of said multi-layered carrier foil are laminated together.

15. Foil-type pressure sensor according to claim 1, wherein layers of said multi-layered carrier foil are deposited on top of one another.

* * * * *

UNITED STATES PATENT AND TRADEMARK OFFICE

CERTIFICATE OF CORRECTION

PATENT NO. : 7,543,510 B2
APPLICATION NO. : 10/538600
DATED : June 9, 2009
INVENTOR(S) : Werner Bieck et al.

It is certified that error appears in the above-identified patent and that said Letters Patent is hereby corrected as shown below:

TITLE PAGE

Item (73) Assignee:

Delete “IKE International Electronics & Engineering S.A.” and insert therefor --IEE International Electronics & Engineering S.A.--.

Signed and Sealed this

Third Day of November, 2009

David J. Kappos
*Director of the United States Patent and Trademark Office*